United States Patent [19]

Takarada et al.

[11] Patent Number: 5,208,289
[45] Date of Patent: May 4, 1993

[54] CURING RESIN COMPOSITION AND ITS CURED PRODUCT

[75] Inventors: Mitsuhiro Takarada; Yuji Yoshikawa; Kenji Yamamoto, all of Gunma; Hiroharu Ohsugi, Ohsaka; Atsushi Ohgaki, Kobe; Ryozo Takagawa, Ohsaka, all of Japan

[73] Assignee: Shin-Etsu Chemical Co., Ltd., Tokyo, Japan

[21] Appl. No.: 675,620

[22] Filed: Mar. 27, 1991

[30] Foreign Application Priority Data

Mar. 27, 1990 [JP] Japan .................................. 2-75728

[51] Int. Cl.$^5$ .............................................. C08L 83/05
[52] U.S. Cl. .................................. 525/100; 525/103; 528/15; 528/26; 528/31
[58] Field of Search ............. 525/446, 100, 103; 528/100, 15, 26, 31

[56] References Cited

U.S. PATENT DOCUMENTS

| | | | |
|---|---|---|---|
| 3,220,972 | 11/1965 | Lamoreaux | 528/15 |
| 4,139,519 | 2/1979 | Itoh et al. | 525/105 |
| 4,382,057 | 5/1983 | Tolentino | 528/15 |
| 4,666,745 | 5/1987 | Huhn et al. | 528/15 |
| 5,008,360 | 4/1991 | Bard et al. | 528/15 |

FOREIGN PATENT DOCUMENTS 1041082  6/1963  United Kingdom .

*Primary Examiner*—John C. Bleutge
*Assistant Examiner*—D. E. Aylward
*Attorney, Agent, or Firm*—Millen, White, Zelano & Branigan

[57] ABSTRACT

This invention discloses a curing resin composition comprising (a) an organic resin containing no less than 2 alkenyl groups per molecule, and having a number average molecular weight of 500–100,000. (b) an organohydrogen-polysiloxane containing no less than 2 Si—H bonds per molecule, and (c) a platinum catalyst. It is desired that the organic resin of component (a) is at least one type chosen from acrylic, polyester and epoxy. The preferable amount of component (b) is such that there are 0.8–4 hydrogen atoms bonded to silicon atoms per alkenyl group of component (a).

19 Claims, No Drawings

CURING RESIN COMPOSITION AND ITS CURED PRODUCT

FIELD OF THE INVENTION

This invention concerns a curing resin composition, and in particular, a curing resin composition with excellent weatherability and physical properties.

BACKGROUND OF THE INVENTION

In the prior art, curing resin compositions are known comprising a hydroxyl group-containing resin such as an acrylic resin or polyester resin, blended with a melamine resin or polyfunctional isocyanate compound as a curing agent. However, in such melamine curing systems, curing requires a high temperature of 150°-230° C. resulting in poor workability and economic viability. They also lose lower alcohols with a corresponding loss of volume. Further, they suffer from the disadvantage of poor weatherability due to the triazine skeleton, and in the case of isocyanate curing systems, there was also the problem of toxicity and decline of weatherability.

Methods have been reported to improve weatherability by condensation crosslinkage at room temperature of acrylic resins wherein alkoxysilyl groups are introduced into the molecule (e.g., Japanese Kokai Koho (Unexamined Publication) Nos. 57-36109 and 58-55666), but as their curing rate was slow, contamination occurred due to hydrolysis of remaining alkoxysilyl groups and they also had poor anti-corrosion properties. Other curing systems have been reported which make use of the reactivity of alkoxysilyl groups and hydroxyl groups in organic resins (e.g., Japanese Kokoku Koho (Examined Publication) No. 63-33512); however, not only their thermocuring rate was slow, but also their resistance to salt water was poor.

On the other hand, systems where a vinylpolysiloxane and organohydrogenpolysiloxane were cured in the presence of a platinum catalyst have been known for many years.

However, the cured product swells up in solvents and therefore has poor solvent resistance. In addition, it has poor alkali resistance and as it also has poor recoatability, its use in the paint field has been very limited.

The improvement of recoatability by using alkoxysiloxane-modified polyesters containing propyl groups (e.g., Japanese Patent Kokai Koho No. 62-263265), and crosslinking methods by using polysiloxanes containing alkoxysilylalkyl groups (e.g., Japanese Kokai Koho Nos. 57-139123 and 61-127733), have been proposed. Even using these methods; however, a curing composition which is satisfactory from the viewpoints of mechanical strength, compatibility with other resins and recoatability, has still not been found.

Further, in recent years, paints which contain organic solvents have been cited as factors responsible for atmospheric pollution.

The inventors carried out intensive studies to resolve these disadvantages in the prior art and found that by crosslinking an organic resin containing unsaturated groups using the addition reaction of an organohydrogenpolysiloxane, the weatherability and physical properties, i.e., solvent resistance, alkali resistance, acid resistance, water resistance, salt water resistance, anti-corrosion properties and contamination resistance, could be improved. In addition, recoatability was satisfactory, and when the composition was used as a paint, there was not necessarily any need to use organic solvents.

SUMMARY OF THE INVENTION

The first object of this invention is therefore to provide a curing resin composition with excellent weatherability.

A second object of this invention is to provide a curing resin composition which cures at low temperature, does not undergo any shrinkage after curing, and can thus be used as a molding resin.

A third object of this invention is to provide a curing resin composition with excellent humidity resistance, water resistance and salt water resistance.

A fourth object of this invention is to provide a curing resin composition with excellent solvent resistance, alkali resistance, acid resistance and recoatability.

A fifth object of this invention is to provide a solvent-free or high solid type curing resin composition which does not cause atmospheric pollution due to organic solvent.

The above objects are attained by a composition comprising (a) at least one type of resin chosen from the group acrylic, polyester or epoxy, having no less than 2 organic groups containing alkenyl groups per molecule, and having a number average molecular weight of 500-100,000; (b) an organohydrogenpolysiloxane containing no less than 2 Si-H bonds per molecule; and (c) a catalytically effective amount of platinum compound.

The curing reaction in the composition proceeds at low temperature, and there is practically no shrinkage after curing. Moreover, as the curing is a crosslinking reaction which involves the formation of Si—C bonds, the cured product has very good weatherability, water resistance and solvent resistance. Consequently, it has good recoatability, and its weatherability is further enhanced.

DETAILED DESCRIPTION OF THE INVENTION

The alkenyl group in the resin used as component (a) of this invention may for example be vinyl, allyl, methylvinyl, dimethylvinyl, cyclohexenyl or butenyl.

The acrylic resin containing alkenyl groups is obtained by copolymerization of an acrylic monomer containing alkenyl groups such as allyl (metha)acrylate or cyclohexenylmethyl methacrylate with another polymerizable monomer.

The acrylic monomer containing alkenyl groups may be obtained for example by a reaction involving the elimination of hydrochloric acid from methacrylic acid chloride and an alkenylic alcohol, a reaction involving the elimination of alcohol from a lower ester of methacrylic acid and an alkenylic alcohol, or an addition reaction of an acrylic monomer containing isocyanate with an alkenylic alcohol.

Of other polymerizable monomers, acrylic monomers are particularly to be preferred. The acrylic monomer may for example be methyl (metha) acrylate, ethyl (metha) n-butyl (metha)acrylate, i-butyl (metha)acrylate, t-butyl(metha)acrylate, 2-ethylhexyl(metha)acrylate, lauryl(metha)acrylate, phenyl(metha)acrylate, benzyl(-metha)acrylate, 2-hydroxyethyl(metha)acrylate, 2-hydroxypropyl(metha)acrylate, 4-hydroxybutyl(metha)acrylate, the addition product of 2-hydroxyethyl(-metha)acrylate and $\epsilon$-caprolactone (e.g., Placcel FM1 (commercial name) manufactured by Daicell Kagaku Kogyo Inc.), glycidyl (metha)acrylate, 3-trimethoxysilylpropyl(metha)acrylate, 3-triethoxysilylpropyl-(metha)acrylate, 3-triethoxysilylpropyl-(metha)acrylate, 3-dimethoxymethylsilylpropyl-(metha)acrylate, 2-acrylamide-2-methylpropanesulfonic acid (metha)acrylate, acid phosphoxypropyl (metha)acrylate, tributyltin(metha)acrylate, (metha)acrylamide, (metha)acryloyl isocyanate, or 2-isocyanate ethyl (metha)acrylate.

In this invention, in addition to the above, a non-acrylic α, β-unsaturated monomer such as styrene, α-methylstyrene, itaconic acid, maleic acid, vinyl acetate, allyl acetate, vinyl trimethoxysilane, vinyl triethoxysilane, vinyl methyl-dimethoxysilane or vinyl methyl-diethoxysilane, can also be copolymerized. It is however preferable that the proportion of said monomer is no more than 50 wt %.

Other methods of synthesizing the acrylic resin containing alkenyl groups are for example, the addition reaction of an acrylic resin containing hydroxyl groups with an alkenylic isocyanate compound and/or anhydride of a carboxylic acid containing alkenyl groups; addition reaction of an acrylic resin containing isocyanate with an alkenylic alcohol; addition reaction of an acrylic resin containing carboxyl groups with an epoxy compound containing alkenyl groups; and addition reaction of an acrylic resin containing epoxy groups with a carboxylic acid containing alkenyl groups.

The acrylic resin containing hydroxyl groups may be obtained by copolymerization of an acrylic monomer containing hydroxyl groups such as 2-hydroxylethyl-(metha)acrylate, 2-hydroxypropyl-(metha)acrylate, 4-hydroxybutyl-(metha)acrylate, the addition product of 2-hydroxyethyl-(metha)acrylate and ε-caprolactone (e.g. the Placcel FM series) with another acrylic monomer, or with a non-acrylic α, β-unsaturated monomer in a proportion of no more than 50 wt %, or by homopolymerization of an acrylic monomer containing hydroxyl groups. The alkenylic isocyanate may for example be allyl isocyanate, (metha)acryloyl isocyanate, or 2-isocyanate ethyl (metha)acrylate.

The anhydride of the carboxylic acid containing alkenyl groups may be itaconic anhydride, maleic anhydride or tetrahydrophthalic anhydride.

The acrylic resin containing isocyanate may be obtained by copolymerization of an acrylic monomer containing isocyanate such as (metha)acryloyl isocyanate or 2-isocyanate ethyl (metha)acrylate with another acrylic monomer, or with a non-acrylic α, β-unsaturated monomer in a proportion of no more than 50 wt %, or by homopolymerization of an acrylic monomer containing isocyanate.

The alkenylic alcohol may for example be allyl alcohol, vinyl alcohol, 3-butene-1-ol, 2-(allyloxy)ethanol, glycerine diallyl ether, tetrahydrobenzyl alcohol, 3-methyl-2-butene-1-ol, 3-methyl-3-butene-1-ol, 2-methyl-3-butene-2-ol, oleyl alcohol and crotyl alcohol.

The acrylic resin containing carboxyl groups may be obtained by copolymerization of an acrylic monomer containing carboxyl groups such as (metha)acrylic acid and/or an acrylic monomer containing carboxyl groups into which an α, β-unsaturated monomer with carboxyl groups such as itaconic acid or maleic acid has been incorporated with another acrylic monomer and/or a non-acrylic α, β-unsaturated monomer, the proportion of α, β-unsaturated monomer in the product being no more than 50 wt %, or by homopolymerization of an acrylic monomer containing carboxyl groups.

The epoxy compound containing alkenyl groups may for example be allyl glycidyl ether.

The acrylic resin containing epoxy groups may be obtained for example by copolymerization of an acrylic monomer containing epoxy groups such as glycidyl (metha)acrylate with another acrylic monomer, or with a non-acrylic α, β-unsaturated monomer in a proportion of no more than 50 wt %, or by homopolymerization of an acrylic monomer containing epoxy groups.

The carboxylic acid containing alkenyl groups may for example be allyl acetate, (metha)acrylic acid, 2-butenonic acid, 3-butenonic acid, crotonic acid, 10-undeconoic acid or linoleic acid.

Further, the polyester resin containing no less than 2 alkenylic organic groups per molecule may be easily manufactured by condensation polymerization of the above alkenylic alcohols and a polyfunctional alcohol with a polybasic acid.

The polyfunctional alcohol may for example be ethylene glycol, propylene glycol, 1,6-hexane diol, diethylene glycol, neopentyl glycol, hydroxypivalic acid neopentyl glycol ester, trimethylolpropane or a dimethylsiloxane containing alcoholic hydroxyl groups at both ends. The polybasic acid may for example be phthalic anhydride, isophthalic acid, terephthalic acid, adipic acid, azelaic acid or trimellitic acid. Further, some monofunctional alcohol or monobasic acid may also be used if necessary. Other methods of synthesizing polyester resins containing alkenyl groups are for example, an addition reaction of the carboxyl groups of the polyester resin obtained by condensation polymerization of said polyfunctional alcohols and polybasic acids, with said epoxy compounds containing alkenyl groups, and an addition reaction of the hydroxyl groups of the polyester resin obtained by condensation polymerization of polyfunctional alcohols and polybasic acids with said alkenylic isocyanates and/or the anhydrides of carboxylic acids containing alkenyl groups.

The epoxy resin containing no less than 2 alkenylic organic groups per molecule may, with the exception of said acrylic resins containing epoxy groups, be easily manufactured for example by the addition reaction of bisphenyl A diglycidyl ether and said carboxylic acids containing alkenyl groups, or by the addition reaction of the hydroxyl groups of an epoxy resin, prepared by the condensation polymerization reaction of epichlorohydrin and bisphenol A, and said alkenylic isocyanates and/or anhydrides of carboxylic acids containing alkenyl groups.

The molecular weight of these acrylic resins, polyester resins or epoxy resins is preferably 500–100,000, but more preferably 2,000–50,000.

If the organic resin containing alkenyl groups has a molecular weight of less than 500, it has poor film-forming properties and the film is weak; conversely, if its molecular weight is greater than 100,000, the resin is highly viscous, has poor workability and is unsuitable as a high solid type resin composition—that is, a proportion of non-volatiles is high.

Component (b) of this invention is an organohydrogenpolysiloxane containing no less than 2 Si—H bonds per molecule. It crosslinks the alkenyl groups of component (a) by hydrosilylation.

The organohydrogenpolysiloxane of component (b) may be represented by the following general formulae (1)–(3):

GENERAL FORMULA (1):

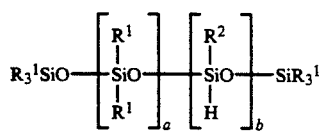

Where $R^1$ and $R^2$ are pheny or alkyl groups with 1-6 carbon atoms, a is an integer in the range $0 \leq a \leq 100$, and b is an integer in the range $2 \leq b < \leq 100$.

GENERAL FORMULA (2):

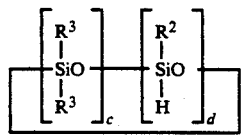

Where $R^2$ and $R^3$ are phenyl or alkyl groups with 1-6 carbon atoms, c is an integer in the range $0 \leq c \leq 8$, d is an integer in the range $2 \leq d \leq 10$, and $3 \leq c+d \leq 10$.

GENERAL FORMULA (3):

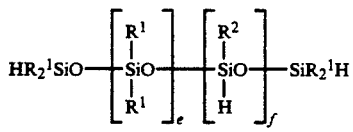

Where $R^1$ and $R^2$ are phenyl or alkyl groups with 1-6 carbon atoms, e is an integer in the range $2 \leq e \leq 100$, an f is an integer in the range $0 \leq f \leq 100$.

The alkyl groups with 1-6 carbon atoms, $R^1$, $R^2$ and $R^3$, may be methyl, ethyl, propyl or butyl, but from an industrial viewpoint, methyl and propyl are to be preferred. Further, the degree of polymerization is specified by a–f. For siloxanes with a higher degree of polymerization than those given by the above ranges, viscosity increases, workability is poor and compatibility with component (a) declines. From the viewpoint of improving compatibility, compounds which include phenyl as the organic group are to be preferred.

Examples of component (b) which are particularly to be preferred are, therefore, methylphenyl hydrogenpolysiloxane and methylpropylhydrogenpolysiloxane.

We give below some specific examples of component (b), but this invention is by no means limited to these examples.

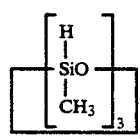

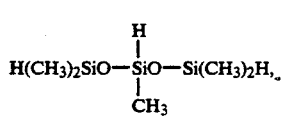

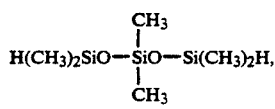

-continued

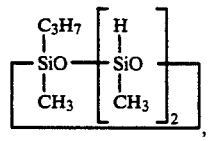

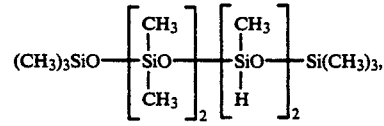

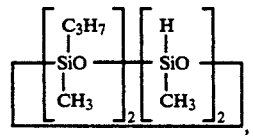

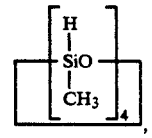

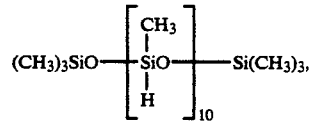

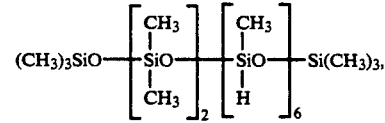

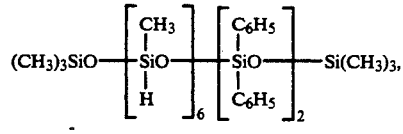

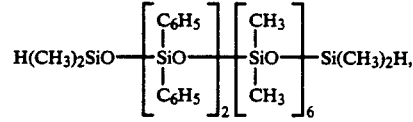

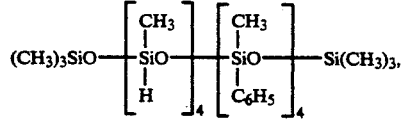

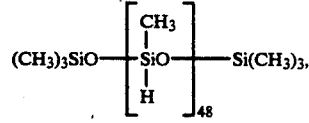

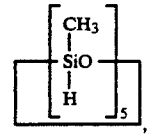

-continued

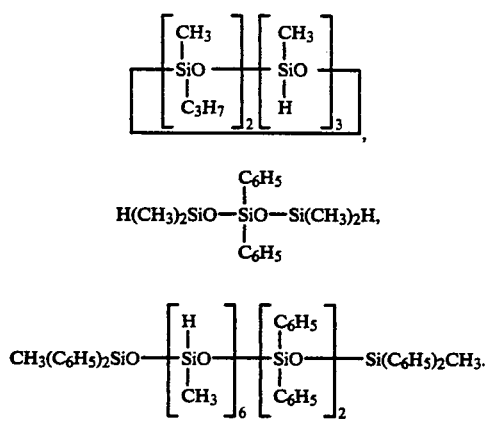

$$H(CH_3)_2SiO-\underset{\underset{C_6H_5}{|}}{\overset{\overset{C_6H_5}{|}}{Si}}O-Si(CH_3)_2H,$$

$$CH_3(C_6H_5)_2SiO\left[\begin{array}{c}H\\|\\SiO\\|\\CH_3\end{array}\right]_6\left[\begin{array}{c}C_6H_5\\|\\SiO\\|\\C_6H_5\end{array}\right]_2Si(C_6H_5)_2CH_3.$$

The amount of component (b) added is preferably such that there are 0.8–4, but more preferably 1.0–1.5, hydrogen atoms bonded to silicon per alkenyl group of component (a). Hence, by adjusting the amount of component (b) which is added, a cured product with excellent weatherability, luster and pliability can be obtained. If the number of hydrogen atoms is less than 0.8 or more than 4, the resin or coating film deteriorates due to reaction of residual alkenyl groups or hydrogen atoms with moisture or contaminants, or due to the action of ultraviolet light.

Component (c) of this invention is a catalyst intended to cure components (a) and (b). For this purpose, platinum with valency 0 or 4 may be used, but from an industrial viewpoint chloroplatinic acid is to be preferred. The curing reaction then proceeds at low temperature such as 80°–180° C., and there is practically no shrinkage after curing.

The amount of platinum atoms is preferably 5–1,000 ppm, but more preferably 10–500 ppm, with respect to 100 parts by weight of a mixture of components (a) and (b). If it is less than 5 ppm curing properties are poor, while if it is greater than 1,000 ppm the composition tends to cure before application or molding which is undesirable.

In this invention, in order to control reactivity, a substance which slows curing by coordinating with the platinum catalyst, for example, an acetylenic compound, may also be added in a suitable proportion. This retarding agent should preferably be such that it volatilizes outside the system when vaporized, or such that it is present in a closed system and evaporates when the system is opened so as to activate the platinum catalyst. Examples of such retarding agents are ethynyl alcohol, 3-ol-propine, 3-ol-3, 3-dimethylpropine, 3-trimethylsiloxypropine, and 3-trimethylsiloxy-3, 3-dimethylpropine.

The mixture of components (a), (b) and (c) is cured either without a solvent or after dissolving in an organic solvent at room temperature or by heating. The preferable curing temperature is 80°–180° C. The crosslinkages formed by the curing reaction are Si—C bonds, unlike the case of the curing reaction which takes place by condensation of silanols and alcohols or alkoxy groups. The cured product therefore has excellent moisture resistance, water resistance and salt water resistance. Further, as the product is cured by crosslinking, it has quite good solvent resistance, alkali resistance and recoatability.

Further, pigments and additives may be added to the resin composition of this invention if desired, but the addition of substances or compounds which interfere with the hydrosilylation reaction, for example substances containing elements such as nitrogen, phosphorus and arsenic, is undesirable.

By applying to metals such as ion and alumina, inorganic materials such as slate, concrete and tile or resins such as epoxy resin, acrylic resin, urethane resin and silicone resin and curing the composition of this invention, a paint film with high durability, weatherability and water resistance is obtained. Further, by molding and curing the composition, a cured product with excellent mechanical properties and pliability is obtained. The composition may therefore be used as for example an external finish for paints, protective coating, electrical insulation material, anti-soiling topcoat and molding resin. Further, by using the composition of this invention, a high solid paint of low viscosity can also be obtained.

EXAMPLES

We shall now describe this invention in more detail by means of specific examples, but it should be understood that the invention is in no way limited to them. All proportions are parts by weight.

MANUFACTURING EXAMPLE 1

70 parts of xylene and 20 parts of butanol were introduced into a reaction vessel. After raising the temperature to 110° C. while introducing nitrogen gas, a mixed solution comprising 10 parts styrene, 10.7 parts methacrylic acid, 16.7 parts 2-ethylhexyl methacrylate, 40.1 parts methylmethacrylate, 22.5 parts ethyl acrylate and 1. 2 parts t-butylperoxy 2-ethylhexanoate was dripped in over 3 hours. After the addition was complete, the mixture was aged at 105° C. for 1 hour, 10 parts xylene and 0.2 parts t-butylperoxy 2-ethylhexanoate were dripped in over 30 minutes, and the mixture aged at 105° C. for a further 2 hours. The reaction temperature was then raised to 120° C., then 13 parts of allyl glycidyl ether and 0.2 parts of dimethylbenzylamine were each dripped in over 30 minutes.

The yield of the addition reaction of carboxy groups to glycidyl groups was measured by means of acid titratione. After 2 hours, an acrylic resin solution [A] was obtained with a yield of 86%. Non-volatiles in the solution [A] accounted for 52.8 wt %.

MANUFACTURING EXAMPLE 2

80 parts of xylene were introduced into a reaction vessel while introducing nitrogen gas, and a mixed solution comprising 13.9 parts methacroyl isocyanate, 28.4 parts 2-ethylhexyl methacrylate, 34.6 parts methacrylate, 23.2 parts ethyl acrylate and 1.2 parts t-butylperoxy 2-ethylhexanoate were dripped in over 3 hours. After the addition was complete, the mixture was aged at 105° C. for 1 hour, 20 parts xylene and 0.5 parts t-butylperoxy 2-ethylhexanoate were dripped in over 30 minutes, and ageing carried out at 105° C. for a further 2 hours. 20 parts butyl acetate were then added and after cooling to 50° C. 7.2 parts of allyl alcohol were dripped in over 30 minutes.

30 minutes after this addition was completed, the yield of the reaction between isocyanate and alcohol was measured by IR. It was found that the isocyanate absorption at 2,230 cm-1 had completely disappeared. The solution obtained will be referred to as acrylic resin solution [B].

Non-volatiles in the solution [B] accounted for 47.5 wt %.

MANUFACTURING EXAMPLE 3

53.4 parts isophthalic acid, 26.7 parts neopentyl glycol, 17.8 parts hydroxypivalic acid neopentyl glycol ester, 1.6 parts trimethylol propane and 0.05 parts dibutyltin oxide were introduced into a reaction vessel equipped with a dropping funnel. After raising the temperature to 150° C. the temperature was raised to 210° C. over 10 hours, and a dehydration condensation reaction was carried out until the acidity was 5.0. The reaction temperature was then reduced to 120° C., 17.1 parts anhydrous trimellitic acid were introduced gradually, and the mixture aged for 1 hour. 10.2 parts allyl glycidyl ether, 31 parts xylol and 0.2 parts dimethylbenzylamine were then introduced to carry out the reaction. The reaction was terminated after 2 hours when the acidity of the solid fraction was 5.0. 54 parts xylol were introduced into the reaction product to give a polyester resin solution [A]. Non-volatiles in the solution [A] accounted for 58.3 wt %.

MANUFACTURING EXAMPLE 4

35.5 parts bisphenol A diglycidyl ether was introduced into a reaction vessel, and the temperature was raised to 120° C. 17.2 parts butenonic acid and 0.1 parts dimethylbenzylamine were dripped in over 1 hour, and after ageing for 2 hours, 30 parts of xylol and 5 parts methylisobutyl ketone were added to give an epoxy resin solution [A].

Non-volatiles in the solution [A] accounted for 60.1 wt %.

MANUFACTURING EXAMPLE 5

40 parts xylene and 20 parts butanol were introduced into a reaction vessel, and the temperature was raised to 110° C. while introducing nitrogen gas. A mixed solution comprising 15 parts styrene, 3.1 parts methacrylic acid, 34.1 parts 2-ethylhexyl methacrylate, 31.6 parts methyl methacrylate, 16.2 parts 2-hydroxyethyl methacrylate and 1.2 parts t-butylperoxy 2-ethylhexanoate was then dripped in over 3 hours. After the addition was complete, the mixture was aged at 105° C. for 1 hour, 6.7 parts xylene and 0.2 parts t-butylperoxy 2-ethylhexanoate were dripped in over 30 minutes, and the mixture was aged at 105° C. for 2 hours to give an acrylic resin solution [C]. Non-volatiles in the solution [C] accounted for 59.7 wt %.

MANUFACTURING EXAMPLE 6

53.4 parts isophthalic acid, 26.7 parts neopentyl glycol, 17.8 parts hydroxypivalic acid neopentyl glycol ester, 1.6 parts trimethylol propane and 0.05 parts dibutyltin oxide were introduced into a reaction vessel equipped with a dropping funnel. After raising the temperature to 150° C., the temperature was raised to 210° C. over 10 hours, and a dehydration condensation reaction was carried out until the acidity was 5.0 55 parts xylol were introduced into the reaction product to give a polyester resin solution [B]. Non-volatiles in the solution [B] accounted for 64.4 wt %.

MANUFACTURING EXAMPLE 7

60 parts xylene were introduced into a reaction vessel, and the temperature was raised to 110° C. while introducing nitrogen gas. A mixed solution comprising 30 parts styrene, 30 parts 2-ethylhexyl methacrylate, 40 parts cyclohexenylmethyl methacrylate, and 2.0 parts azobis-isobutyronitrile was then dripped in over 3 hours. After the addition was complete, the mixture was aged at 110° C. for 1 hour, 6.7 parts xylene and 0.2 parts t-butylperoxy 2-ethylhexanoate were dripped in over 30 minutes, and the mixture was aged at 110° C. for a further 2 hours to give an acrylic resin solution [D]. Non-volatiles in the solution [D] accounted for 58.9 wt %.

MANUFACTURING EXAMPLE 8

61.8 parts terephthalic acid, 29.5 parts hydroxypivalic acid neopentyl glycol ester, 9.6 parts trimethylol propane and 0.05 parts dibutyltin oxide were introduced into a reaction vessel equipped with a dropping funnel. After raising the temperature to 150° C., the temperature was raised to 210° C. over 6 hours, and 20 ml of the mixture was distilled off. After cooling to 140° C., 18.3 g of glycerine diallyl ether were introduced, the temperature was raised to 220° C. over 5 hours, and having confirmed that 3.4 g of methanol had distilled off, the reaction was terminated. 67 parts xylol was then introduced into the reaction product to give a polyester resin solution [C]. Non-volatiles in the solution [C] accounted for 58.8 wt %.

MANUFACTURING EXAMPLE 9

60 parts xylene were introduced into a reaction vessel, and the temperature was raised to 110° C. while introducing nitrogen gas. A mixed solution comprising 30 parts styrene, 20 parts 2-ethylhexyl methacrylate, 50 parts cyclohexenylmethyl methacrylate, and 2.0 parts azobis-isobutyronitrile was then dripped in over 3 hours. After the addition was complete, the mixture was aged at 110° C. for 1 hours, 6.7 parts xylene and 0.2 parts t-butylperoxy 2-ethylhexanoate were dripped in over 30 minutes, and the mixture was aged at 110° C. for a further 2 hours to give an acrylic resin solution [E]. Non-volatiles in the solution [E] accounted for 60.3 wt %.

EXAMPLE 1

80 parts of the acrylic resin solution [A], 20 parts of the compound:

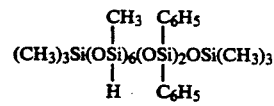

and 0.1 parts of a 2% ethanolic solution of chloroplatinic acid were mixed well together, applied to an iron plate so as to form a dry film of thickness 20 μm, and baked at 180° C. for 20 minutes. The physical properties of the cured film are shown in Table 1.

The values of physical properties were measured as follows.

Pencil hardness:

Measured according to JIS (Japan Industrial Standard) K 5400, paragraph 6-14.

Xylol rubbing test:

The film was rubbed 50 times back and forth with a 1 cm×1 cm piece of cotton wool impregnated with xylene, and its external appearance was judged visually.

Mandrel test:

Measured according to JIS K 5400, paragraph 6–16.

The external appearance of the film was judged visually using a 2 mm mandrel.

Impact resistance test:

Measured according to JIS K 5400, paragraph 6–13.

A 300 g weight was dropped from a height of 50 cm, and the external appearance of the film was judged visually.

Initial luster:

Titanium oxide (commercial name:TIPAQUE R-820, Ishihara Industries K.K.), was added to each resin in the proportion of 40 parts based on 100 parts by weight of solid resin and dispersed by a Ball Mill. The resulting white paint was cured, and the 60 degree mirror surface luster (prior to weatherability test) was measured. The curing of the paint film of each Example and Comparative Example was carried out in the same way.

Weatherability:

Weatherability was measured by visually judging the retention of 60 degree mirror surface luster and external appearance after exposure to 2,000 hrs of sunshine weather meter.

Acid resistance:

0.2 cc of a 0.1N (normal) sulfuric acid solution was applied to each of the cured clear paint films. After leaving at 20° C. and 75% humidity for one day and night, the films were dried at 60° C. for 10 minutes, and their deterioration was visually judged.

⊚: excellent resistance

○: good resistance

Δ: some marks on film x: clouding of film

Viscosity test:

Each resin system was adjusted with xylol such that non-volatiles accounted for 55 wt %, and its viscosity was measured at 25° C. by an E type viscometer.

EXAMPLE 2

80 parts of the acrylic resin solution [A], 20 parts of 1,3,5,7-tetramethyl-1-propylcyclotetrasiloxane and 0.1 parts of a 2% ethanolic solution of chloroplatinic acid were mixed well together, applied to an iron plate so as to form a dry film of thickness 20 μm, and baked at 180° C. for 20 minutes. The physical properties of the cured film are shown in Table 1.

EXAMPLE 3

60 parts of the acrylic resin solution [B], 20 parts of the compound:

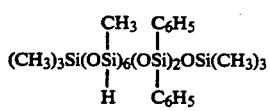

and 0.1 parts of a 2% ethanolic solution of chloroplatinic acid were mixed well together, applied to an iron plate so as to form a dry film of thickness 20 μm, and baked at 180° C. for 20 minutes. The physical properties of the cured film are shown in Table 1.

EXAMPLE 4

60 parts of the polyester resin solution [A], 20 parts of the compound:

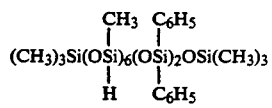

and 0.1 parts of a 2% ethanolic solution of chloroplatinic acid were mixed well together, applied to an iron plate so as to form a dry film of thickness 20 μm, and baked at 180° C. for 20 minutes. The physical properties of the cured film are shown in Table 1.

EXAMPLE 5

80 parts of the epoxy resin solution [A], 20 parts of the compound:

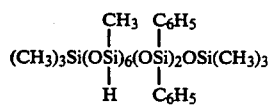

and 0.1 parts of a 2% ethanolic solution of chloroplatinic acid were mixed well together, applied to an iron plate so as to form a dry film of thickness 20 μm, and baked at 180° C. for 20 minutes. The physical properties of the cured film are shown in Table 1.

EXAMPLE 6

100 parts of the acrylic resin solution [D], 30 parts of the compound:

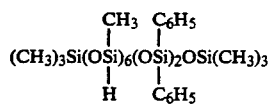

and 0.1 parts of a 2% ethanolic solution of chloroplatinic acid were mixed well together, applied to an iron plate so as to form a dry film of thickness 20 μm, and baked at 140° C. for 25 minutes. The physical properties of the cured film are shown in Table 1.

EXAMPLE 7

100 parts of the polyester resin solution [C], 30 parts of the compound:

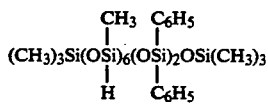

and 0.1 parts of a 2% ethanolic solution of chloroplatinic acid were mixed well together, applied to an iron plate so as to form a .dry film of thickness 20 μm, and baked at 180° C. for 20 minutes. The physical properties of the cured film are shown in Table 1.

EXAMPLE 8

100 parts of the acrylic resin solution [E], 30 parts of the compound:

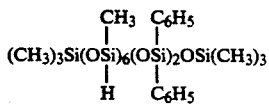

and 0.1 parts of a 2% ethanolic solution of chloroplatinic acid were mixed well together, applied to an iron plate so as to form a dry film of thickness 20 μm, and baked at 140° C. for 25 minutes. The physical properties of the cured film are shown in Table 1.

COMPARATIVE EXAMPLE 1

100 parts of acrylic resin (C) and 43 parts of SUPER BECKAMINE L-127 (a trade name of melamine resin manufactured by Dai Nippon Ink and Chemical Co.) were mixed well together, and cured as in Example 1. The measured physical properties are shown in Table 1.

COMPARATIVE EXAMPLE 2

100 parts of acrylic resin (C), 25 parts of BURNOCK D-950 (a trade name of polyisocyanate manufactured by Dai Nippon Ink and Chemical Co.) and 0.1 parts of dibutyltin dilaurylate were mixed well together, applied to an iron plate, and cured at 25° C. for 1 hour. The physical properties of the film are shown in Table 1.

COMPARATIVE EXAMPLE 3

100 parts of polyester resin [B] and 43 parts of SUPER BECKAMINE L-127 (a trade name of melamine resin manufactured by Dai Nippon Ink and Chemical Co.) were mixed well together, and cured as in Example 1. The measured physical properties are shown in Table 1.

From the results in Table 1, it was confirmed that the curing resin composition of this invention is able to form a cured film which is particularly remarkable for its excellent luster and weatherability.

acrylic resin containing alkenyl groups of component (a) is a copolymerization product of an acrylic monomer containing alkenyl groups and another polymerizable monomer, an addition reaction product of an acrylic resin containing hydroxyl groups and an alkenyl isocyanate compound and/or carboxylic acid anhydride containing alkenyl groups, an addition reaction product of an acrylic resin containing carboxyl groups and an epoxy compound containing alkenyl groups, or an addition reaction product of an acrylic resin containing epoxy groups and carboxylic acids containing alkenyl groups.

2. A curing resin composition as in claim 1 wherein the other polymerizable monomer which copolymerizes with the acrylic monomer containing alkenyl groups is an α, β-unsaturated-monomer.

3. A curing resin composition as in claim 2 wherein no less than 50 wt % of the α, β-unsaturated monomer is an acrylic monomer.

4. A curing resin composition as in claim 1 wherein the acrylic resin containing hydroxyl groups is the copolymerization product of an acrylic monomer containing hydroxyl groups and an α, β-unsaturated monomer.

5. A curing resin composition as in claim 4 wherein no less than 50 wt % of the α, β-unsaturated monomer is an acrylic monomer without hydroxyl groups.

6. A curing resin composition as in claim 1 wherein the acrylic resin containing isocyanate groups is the copolymerization product of an acrylic monomer containing isocyanate groups and an α, β-unsaturated monomer.

7. A curing resin composition as in claim 6 wherein no less than 50 wt % of the α, β-unsaturated monomer is an acrylic monomer without isocyanate groups.

8. A curing resin composition as in claim 1 wherein the acrylic resin containing carboxyl groups is the copolymerization product of an acrylic monomer containing carboxyl groups and an α, β-unsaturated monomer, or the homopolymer of an acrylic monomer containing carboxyl groups.

9. A curing resin composition as in claim 8 wherein no less than 50 wt % of the α, β-unsaturated monomer is an acrylic monomer without carboxyl groups.

TABLE 1

|  | Example 1 | Example 2 | Example 3 | Example 4 | Example 5 | Example 6 |
|---|---|---|---|---|---|---|
| Pencil hardness | H | H | H | H | 2H | H |
| Xylol rubbing test | no change | no change | no change | no change | no change | no change |
| Mandrel test | no change | no change | no change | no change | no change | no change |
| Impact resistance test | no change | no change | no change | no change | no change | no change |
| Initial lustre | 92 | 87 | 85 | 90 | 90 | 90 |
| Acid resistance | ⊙ | ⊙ | ⊙ | ⊙ |  |  |
| Viscosity (centi poise) | 350 | 480 | 310 | 280 | 240 | 95 |
| Weatherability Lustre preservability (%) | 90 | 85 | 88 | 80 | 72 | 90 |
| Film appearance | no change | no change | no change | no change | no change | no change |

|  | Example 7 | Example 8 | comparative example 1 | comparative example 2 | comparative example 3 |
|---|---|---|---|---|---|
| Pencil hardness | H | 2H | 2H | H | H |
| Xylol rubbing test | no change | no change | no change | no change | no change |
| Mandrel test | no change | no change | no change | clack | clack |
| Impact resistance test | no change | no change | no change | no change | clack |
| Initial lustre | 85 | 91 | 85 | 82 | 85 |
| Acid resistance | ⊙ | ⊙ | X | Δ | X |
| Viscosity (centi poise) | 180 | 112 | 750 | 640 | 680 |
| Weatherability Lustre preservability (%) | 82 | 92 | 48 | 60 | 40 |
| Film appearance | no change | no change | partially chalking | partially chalking | partially chalking |

What is claimed is:

1. A curing resin composition comprising (a) an acrylic resin containing no less than two alkenyl groups per molecule and having a number average molecular weight of 500-100,000, (b) an organohydrogenpolysiloxane containing no less than two Si-H bonds per molecule, and (c) a platinum catalyst, wherein the 10. A curing resin composition as in claim 1 wherein the acrylic resin containing epoxy groups is the copolymerization product of an acrylic monomer containing epoxy groups and an α, β-unsaturated monomer, or the homopolymer of an acrylic monomer containing epoxy groups.

11. A curing resin composition as in claim 10 wherein no less than 50 wt % of the α, β-unsaturated monomer is an acrylic monomer without epoxy groups.

12. A curing resin composition as in claim 1 wherein the number average molecular weight of the acrylic resin, of component (a) lies in the range 2,000-50,000.

13. A curing resin composition as in claim 1 wherein the organohydrogenpolysiloxane of component (b) is represented by the formula:

GENERAL FORMULA (1):

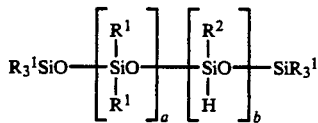

where $R^1$ and $R^2$ are alkyl groups with 1-6 carbon atoms or phenyl, a is an integer in the range $0 \leq a \leq 100$, and b is an integer in the range $2 \leq b \leq 100$.

14. A curing resin composition as in claim 1 wherein the organohydrogenpolysiloxane of component (b) is represented by the formula:

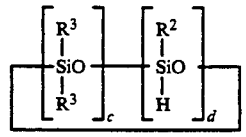

where $R^2$ and $R^3$ are alkyl groups with 1-6 carbon atoms or phenyl, c is an integer in the range $0 \leq c \leq 8$, d is an integer in the range $2 \leq d \leq 10$, and $3 \leq c+d \leq 10$.

15. A curing resin composition as in claim 3 wherein the organohydrogenpolysiloxane of component (b) is represented by the formula:

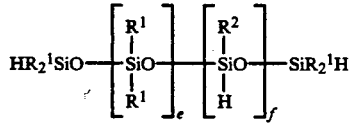

wherein $R^1$ and $R^2$ are $C_{1-6}$-alkyl or phenyl, e is an integer in the range of $2 \leq e \leq 100$, and f is an integer in the range of $0 \leq f \leq 100$.

16. A curing resin composition as in claim 1 wherein the amount of component (b) added is such that there are 0.8–4 hydrogen atoms bonded to silicon atoms per alkenyl group of component (a).

17. A curing resin composition as in claim 1 wherein the amount of catalyst added is 5-1,000 ppm with respect to 100 parts by weight of a mixture of component (a) and component (b).

18. A cured product obtained by curing the composition of claim 1.

19. A resin according to claim 1, wherein the alkenyl groups in component (a) are vinyl, allyl, methylvinyl, dimethylvinyl, cyclohexenyl, or butenyl groups.

* * * * *